(12) United States Patent
Mehfuz et al.

(10) Patent No.: US 12,170,102 B1
(45) Date of Patent: *Dec. 17, 2024

(54) SHORT ON WAFER LASER FOR HEAT ASSISTED MAGNETIC RECORDING

(71) Applicant: Seagate Technology LLC, Fremont, CA (US)

(72) Inventors: Reyad Mehfuz, Londonderry (GB); Niall Donlon, Limerick (IE); Aidan Dominic Goggin, Donegal (IE); Prim Gangmei, Belfast (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,210

(22) Filed: Sep. 29, 2023

Related U.S. Application Data

(63) Continuation of application No. 17/729,719, filed on Apr. 26, 2022, now Pat. No. 11,848,036.

(60) Provisional application No. 63/180,350, filed on Apr. 27, 2021.

(51) Int. Cl.
| | |
|---|---|
| G11B 5/00 | (2006.01) |
| G11B 5/31 | (2006.01) |
| G11B 5/48 | (2006.01) |
| G11B 5/60 | (2006.01) |

(52) U.S. Cl.
CPC ......... *G11B 5/4866* (2013.01); *G11B 5/6088* (2013.01); *G11B 2005/0021* (2013.01)

(58) Field of Classification Search
CPC .............. G11B 5/4866; G11B 5/314; G11B 2005/0021; G11B 5/3133; G11B 5/3134; G11B 5/6088; G11B 13/08; G11B 11/105
USPC ........................................................... 360/59
See application file for complete search history.

(56) References Cited

U.S. PATENT DOCUMENTS

| | | |
|---|---|---|
| 8,325,566 B2 | 12/2012 | Shimazawa et al. |
| 9,799,359 B1 | 10/2017 | Olson et al. |
| 9,875,761 B1 | 1/2018 | Mehfuz et al. |
| 10,170,140 B2 | 1/2019 | Mehfuz et al. |
| 11,848,036 B1 * | 12/2023 | Mehfuz ................ G11B 5/4866 |

* cited by examiner

*Primary Examiner* — Nabil Z Hindi
(74) *Attorney, Agent, or Firm* — Mueting Raasch Group

(57) ABSTRACT

An apparatus includes a substrate. A laser is deposited above the substrate. The laser includes one or more non-self-supporting layers of crystalline material. The laser has a length along a light path in a range of about 40 um to about 350 um. An optical input coupler is configured to receive light from the laser. A waveguide is deposited proximate the optical input coupler. The waveguide is configured to communicate light from the laser via the optical input coupler to a near-field transducer that directs energy resulting from plasmonic excitation to a recording medium.

20 Claims, 11 Drawing Sheets

SHORT ON WAFER LASER FOR HEAT ASSISTED MAGNETIC RECORDING

RELATED APPLICATIONS

This application is a continuation of U.S. application Ser. No. 17/729,719 filed Apr. 26, 2022, which claims the benefit of U.S. Provisional Application No. 63/180,350, filed Apr. 27, 2021, the content of which is hereby incorporated herein by reference.

SUMMARY

Embodiments described herein involve an apparatus comprising a substrate. A laser is deposited above the substrate. The laser comprises one or more non-self-supporting layers of crystalline material. The laser has a length along a light path in a range of about 40 um to about 350 um. An optical input coupler is configured to receive light from the laser. A waveguide is deposited proximate the optical input coupler. The waveguide is configured to communicate light from the laser via the optical input coupler to a near-field transducer that directs energy resulting from plasmonic excitation to a recording medium.

An apparatus comprises a substrate. A laser is deposited above the substrate. The laser comprises one or more non-self-supporting layers of crystalline material. The laser has a length along a light path in a range of about 40 um to about 350 um. An optical input coupler is configured to receive light from the laser. One or more additional optical components are configured to perform one or more of controlling laser stability and boosting the light from the laser to a near-field transducer. A waveguide is deposited proximate the optical input coupler, the waveguide configured to communicate light from the laser via the optical input coupler to the near-field transducer that directs energy resulting from plasmonic excitation to a recording medium.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
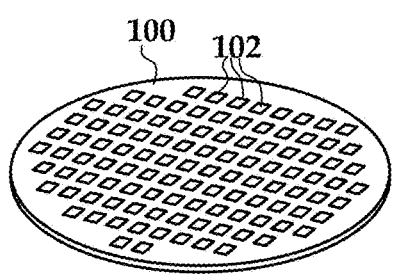
FIGS. 1-5 are diagrams showing a transfer printing process in accordance with embodiments described herein.

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer, that shapes and directs the energy from the energy source to the recording medium.

In some implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes.

According to embodiments described herein, the space on a slider is very limited. When adding printed structures such as lasers and/or reader amplifier on the slider, heat sinking may be performed to sink heat away from the slider components. In general, the laser and/or other slider structures are fabricated on a heat sink disposed on a portion of a surface of the substrate of the slider. The heat sink may have one or more layers of highly thermally conductive materials configured to conduct heat away from the laser diode and/or other structures and use the substrate as a heat sink. In some cases, the heat sink may provide bonding for various transfer printed structures in the recording head. Properties of heat sink layer and/or layers adjacent to the laser diode may be chosen to match a coefficient of thermal expansion and/or other property of the laser diode to facilitate bonding of the laser diode and/or other slider structures to the substrate. The substrate may comprise a material (e.g., AlTiC) with a limited thermal conductivity. For example, the thermal conductivity of the substrate may be about 20 W/m·K.

According to embodiments described herein, an underlayer of a highly thermally conductive material may be disposed between the substrate and the heat sink and may be deposited before building any of the first layers of the slider. The underlayer may comprise Cu with a thermal conductivity of about 200 W/mK. For example, the underlayer may comprise Cu with a thermal conductivity of about 200 W/mK. Adding the highly thermally conductive underlayer allows added heat sinking without disrupting the build order, move features, or increase reader/writer separation.

In the present disclosure, hard drive recording heads are used onto which at least part of a semiconductor laser (e.g., crystalline, epitaxial layer) is not self-supporting (e.g., not a separately packaged device) but is physically carried by same substrate that carries the other components of the read/write head (e.g., write coil and poles, reader stack) without the use of a separate or intermediate support during attachment. Carrying the semiconductor laser with the read/write head substrate, without a separate or intermediate support substrate, can help to reduce the size and weight of the head, and it can also allow for the use of laser geometries and designs that are very different from simple edge-emitting cleaved facet lasers that have been proposed in the past. A thermally conductive underlayer may be provided that is configured to reduce the temperature of the laser diode and various surrounding structures. The underlayer may also be used to provide good thermal coupling between the laser diode and the substrate and other surrounding components of the hard drive recording head.

In at least some cases, parts of the laser (e.g., GaAs active region) are incompatible with epitaxial growth on the substrate. According to various embodiments, active regions comprising materials different than GaAs are used. In some cases, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the slider-integral laser.

This process of transferring non-self-supporting layers of epitaxial-growth-incompatible layers is referred to herein as On-Wafer Laser (OWL) process integration. This process may also be referred to as transfer printing, dry transfer printing, nanoprinting, etc. In FIGS. 1-5, block diagrams illustrate transfer printing of components onto a recording head according to an example embodiment.

In FIG. 1, a donor substrate 100 includes a number of components 102 (e.g., epitaxial layers) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: epitaxial material layer, adhesion or protection layers, carrier layers (to increase thickness for easier transport), bonding layers to aid in best print transfer, and integration layers to enable subsequent integration (e.g., stop features to allow planarization after integration).

Figure 2:
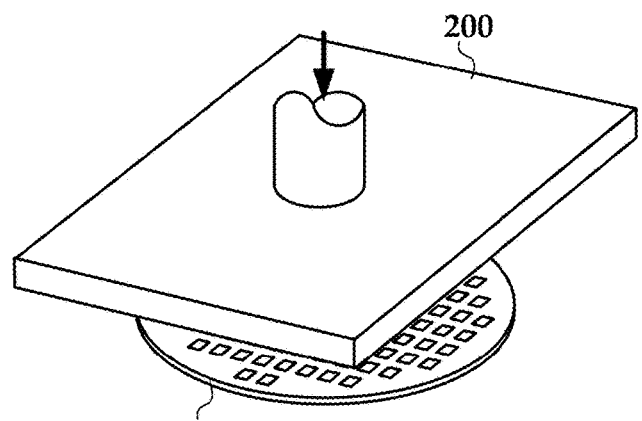
Figure 3:
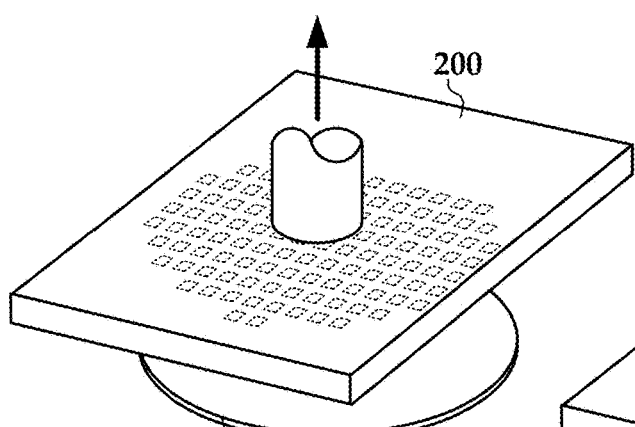

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 210 as shown in FIGS. 4-5.

Figure 4:
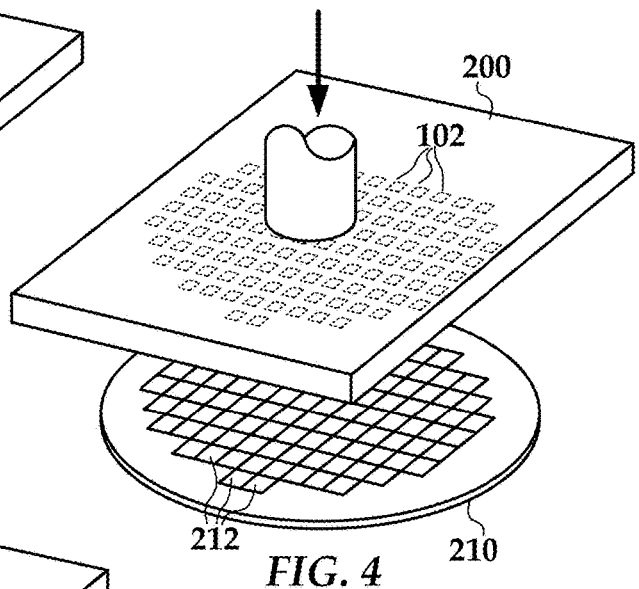
Figure 5:
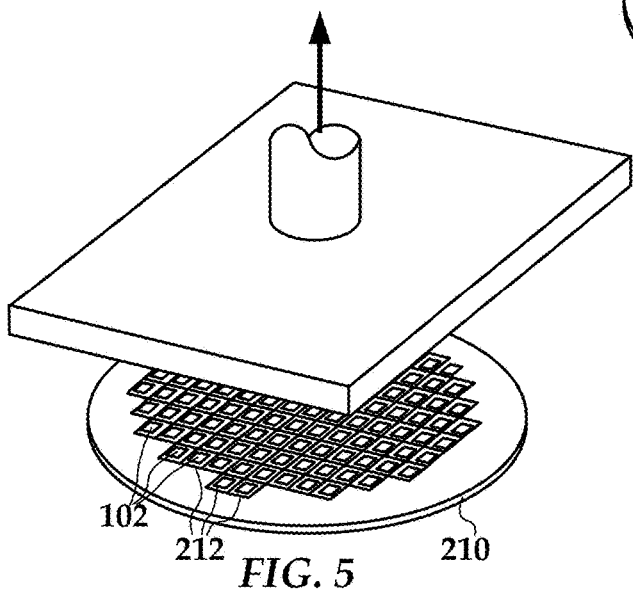

As seen in FIG. 4, the transfer print head 200 is lowered over a wafer 210 that includes a number of partially-processed recording heads 212. The transfer print head 200 presses the components 102 on to the wafer 210 and is then pulled away as seen in FIG. 5. This attaches the components 102 to the recording heads 212. Afterwards, the wafer 210 is further processed, e.g., etching the components 102 to final shape and alignment, and depositing additional layers of material to form the remaining recording head components.

Figure 6:
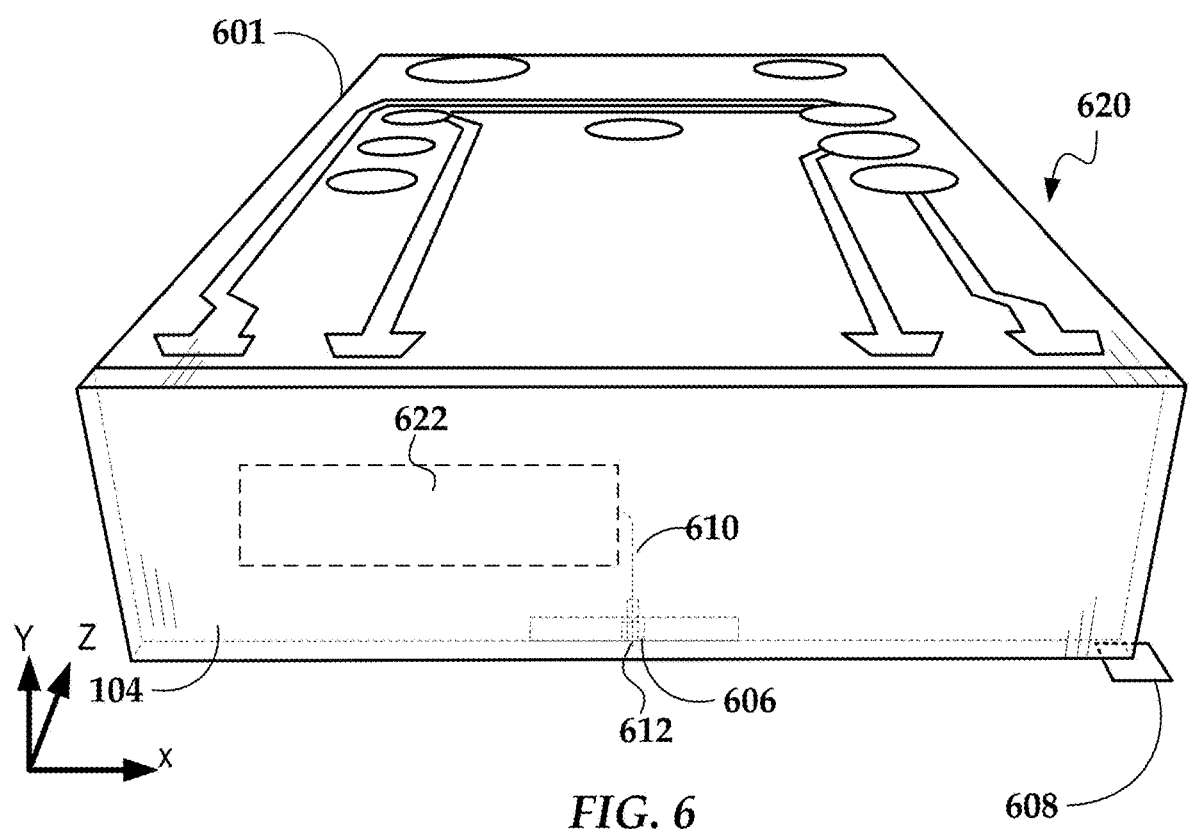
FIG. 6 is a perspective view of a slider having an On-Wafer Laser in accordance with embodiments described herein.

FIG. 6 shows a perspective view of a HAMR write head 620 in accordance with embodiments described herein. As described above, at least part of the laser diode 622 is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. The laser diode 622 delivers light to a region proximate a HAMR read/write transducer 606, which is located near the media-facing surface 608. The media-facing surface 608 faces and is held proximate to the moving media surface while reading and writing to the media. The media-facing surface 108 may be configured as an air-bearing surface (ABS) that maintains separation from the media surface via a thin layer of air.

The energy is used to heat the recording media as it passes by the read/write transducer 606. Optical coupling components, such as a waveguide system 610, are formed integrally within the slider body 601 (near a trailing edge surface in this example) and function as an optical path that delivers energy from the laser diode 622 to the recording media via a near-field transducer 612. The near-field transducer 612 is located near the read/write transducer 606 and causes heating of the media during recording operations. The near-field transducer 612 may be made from plasmonic materials such as gold, silver, copper, etc.

Figure 7A:
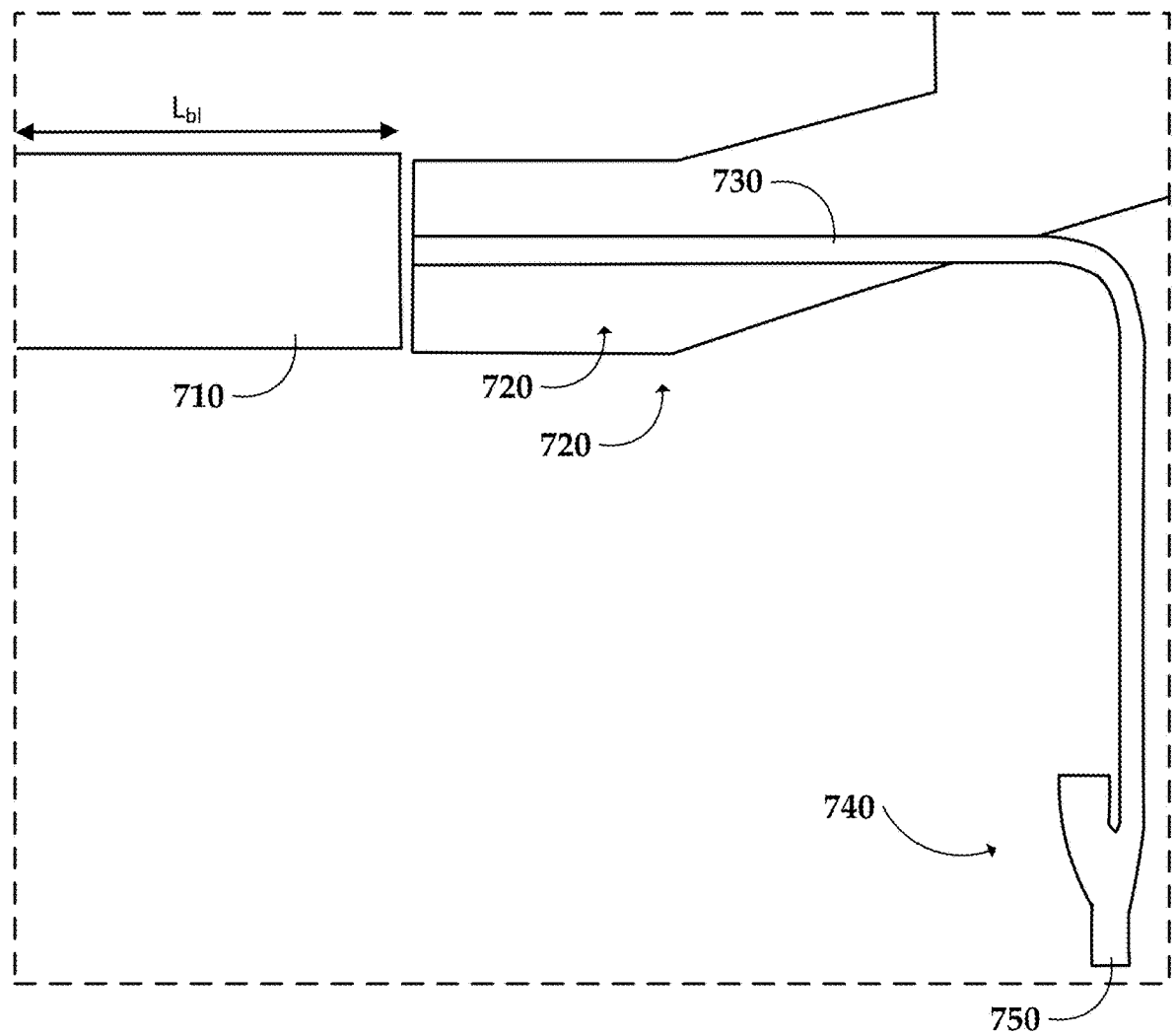
FIG. 7A shows a portion of a slider having an On-Wafer Laser in accordance with embodiments described herein.

According to various embodiments a HAMR light path includes a 220 μm laser 710, an optical input coupler 720 and substantially a 90° bent waveguide 730 with a mode converter 740 as shown in FIG. 7A. Specifically, the laser 710 emits light substantially parallel to a media facing surface. The light is then delivered to an NFT 750 at a media facing surface. The light is delivered to This laser and waveguide combination occupies most of the slider real estate without leaving room for other optical components. In this embodiment, the laser may include about four quantum wells.

Shortening a length of the laser may be useful for freeing up precious slider real estate allowing for additional optical components, for example. Embodiments described herein involve a semiconductor laser device that is less than half of the size of a conventional HAMR laser. For example, a laser that is about 100 μm in length may be used freeing up about 120 μm by about 60 μm of space. Generally, shorter cavity lasers show poor thermal performance. Improvement in thermal robustness may be done by using more than four quantum wells, subsequent barriers layers of GaAs/AlGaAs, and/or an adjusted ridge width in comparison to the conventional laser. As a by product, internal and external quantum efficiencies may also be improved. For example, eight quantum wells may be used as compared to four in a conventional design. In this embodiment, eight quantum wells are used. While various embodiments described herein use barrier layers GaAs/AlGaAs as an example, it is to be understood that the barrier layers can comprise any suitable material.

Figure 7B:
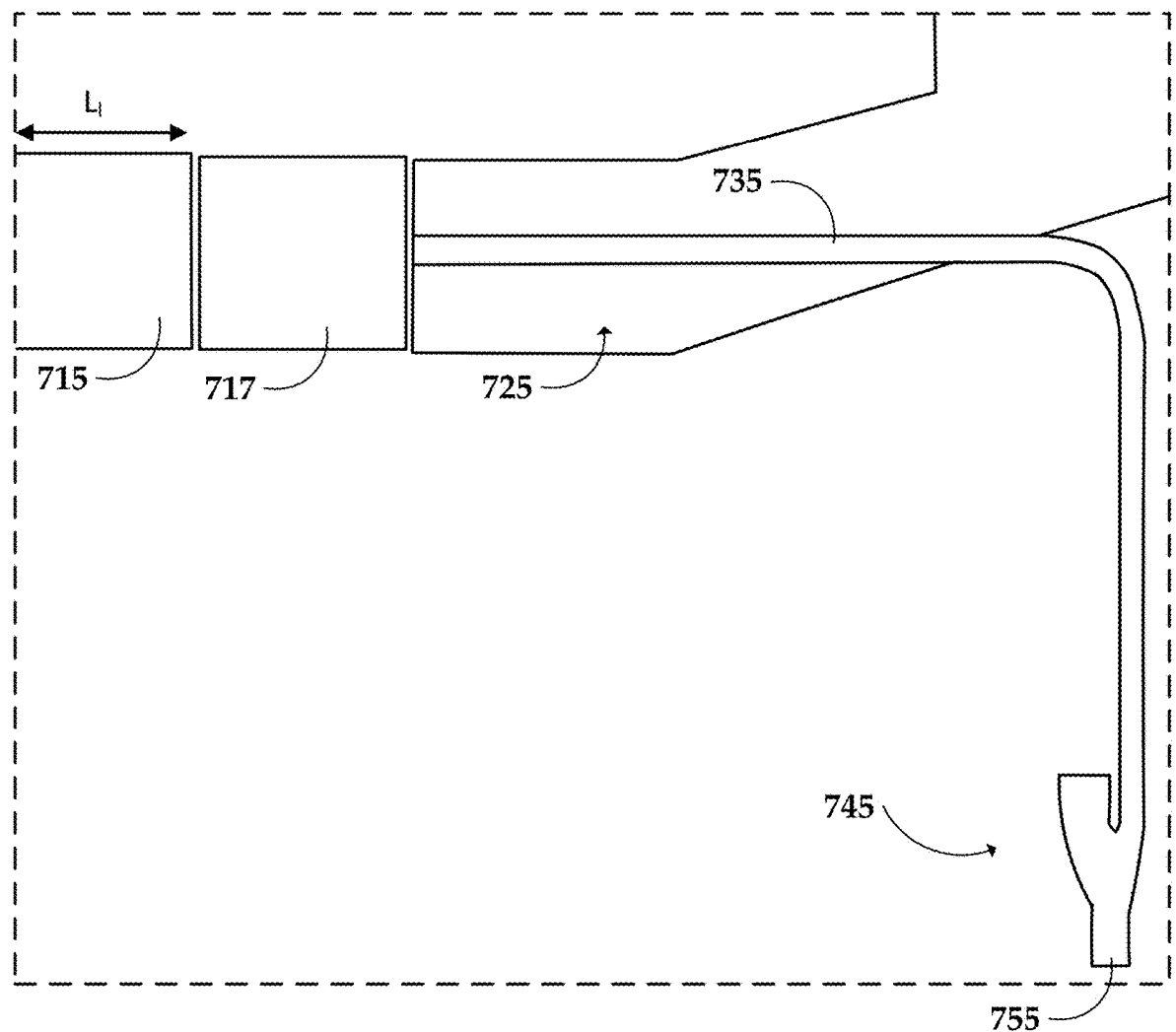
FIG. 7B shows a portion of a slider having a compact On-Wafer Laser in accordance with embodiments described herein.

FIG. 7B shows an embodiment having a shorter cavity laser design. The embodiment shown in FIG. 7B may use one or more of GaAs and/or AlGaAs semiconductor materials. According to various embodiments the shorter cavity laser design does not sacrifice output performance when compared to the embodiment shown in FIG. 7A. In this example, the light path includes a shortened laser 715. The shortened laser 715 may have a length, $L_L$, in a range of about 40 um to about 380 um or in a range of about 60 um to about 250 um In some cases, $L_L$ is about 100 µm. According to various aspects, the embodiment shown in FIG. 7B has multiple quantum wells. For example, it may have between two and 10 quantum wells. In some case, the laser shown in FIG. 7B has eight quantum wells.

The waveguide 735 includes a mode converter 745 that, in this example, converts light from a transverse electric (TE) fundamental mode (TE00) to a higher order mode (TE10). This mode converter 745 is configured as a branch waveguide that separates from the main path of the core. Other types of mode converters may be used, and in some embodiments (e.g., where the NFT 750 can use the fundamental mode) the mode converter 745 may be optional.

Because the laser takes up less space in this embodiment, there is room for additional optical components 717. The additional optical components 717 may be useful to control laser and/or light path instability. For example, the additional optical components 717 may include one or more of a ring resonator and an optical isolator. In some cases, other types of optical components may be useful such as those that are configured to boost the light delivered to the NFT. For example, the additional optical components may include a semiconductor optical amplifier.

Figure 8A:
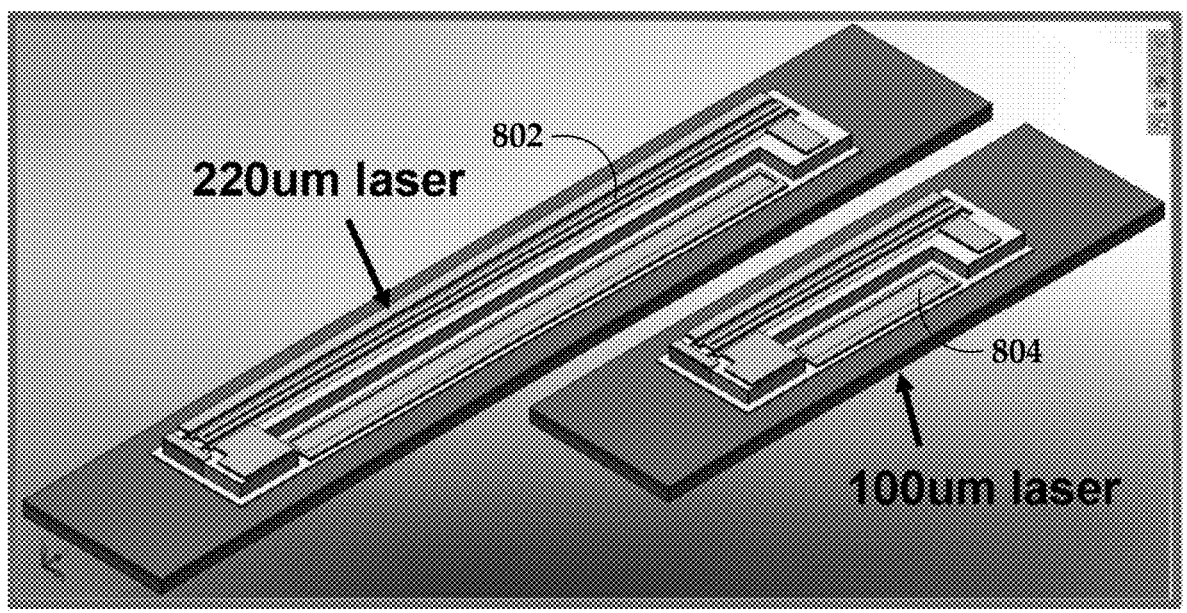
FIG. 8A illustrates a baseline laser compared to a compact laser in accordance with embodiments described herein.
Figure 8B:
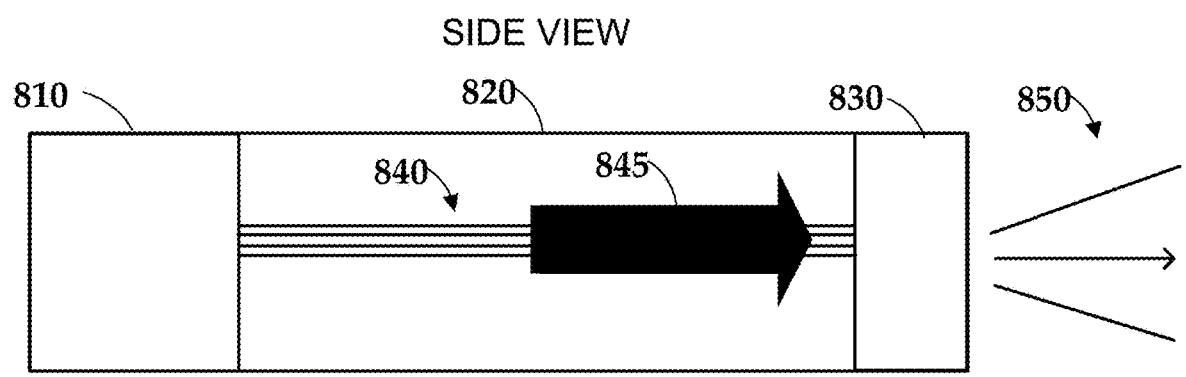
FIGS. 8B and 8C show different views of the laser in accordance with embodiments described herein.
Figure 8C:
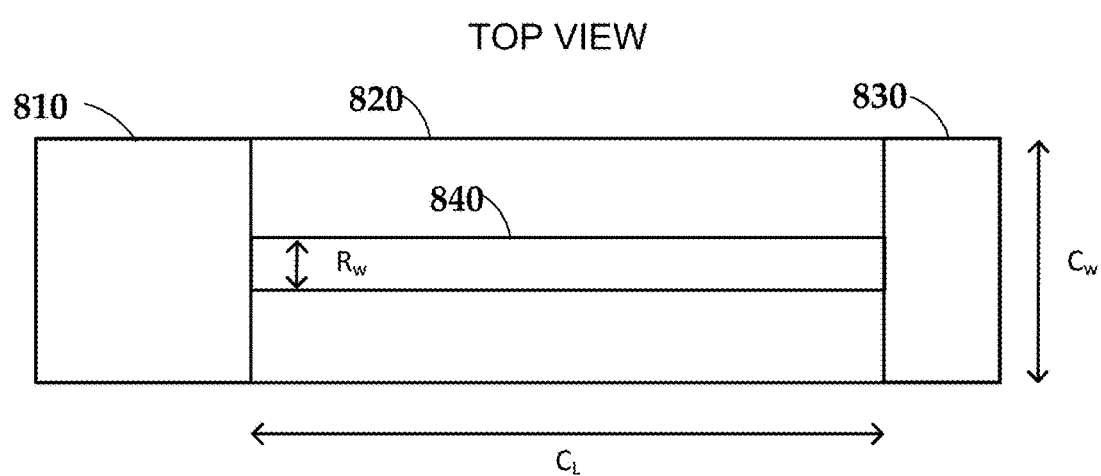

FIG. 8A shows a comparison of the short laser 802 in comparison to a traditional laser 804. FIGS. 8B and 8C illustrate different views of a laser in accordance with embodiments described herein. The laser 820 has a back facet 810 and an active region 840 having one or more ridges as can be seen in the side view shown in FIG. 8B. While the examples shown herein illustrate an active region having ridges, it is to be understood that embodiments described herein may be used in embodiments without ridges. Light travels along the light propagation direction 845 towards the front facet 830 where the light exits the laser 850. The front facet has one or more layers 332, 334. While the example shown here illustrates a front facet having two layers, it is to be understood that the front facet may have any number of layers. According to embodiments described herein, the front and/or the back facet comprises one or more of thin metal films, oxides, nitrides, and semiconductor passivation layers. The laser has a cavity width, $C_w$, a cavity length $C_L$, and a ridge width, $R_w$.

Example

Table 1 summarizes selected output parameters of the proposed design versus a 220 um design.

TABLE 1 summarizes selected output parameters of the proposed design versus a 220 um design.

| No | Output | Unit | 220 µm design | Proposed 100 µm |
|---|---|---|---|---|
| 1 | Threshold current, Ith | mA | 12.5 | 9.5 |
| 2 | Threshold current density, Jth | kA/cm^2 | 2.84 | 3.6 |
| 3 | Slope efficiency, SE | W/A | 1.08 | 1.2 |

TABLE 1-continued summarizes selected output parameters of the proposed design versus a 220 um design.

| No | Output | Unit | 220 µm design | Proposed 100 µm |
|---|---|---|---|---|
| 4 | Power conv eff, WPE@25 mW | | 0.37 | 0.40 |
| 5 | Vertical far field, VFF | degree | 24 | 23.8 |
| 6 | Horizontal far field, HFF | degree | 7.2 | 6.27 |
| 7 | Facet power density @25 mW | MW/cm^2 | 4.3 | 4.3 |
| 8 | Wavelength (25 C.) | nm | 829 | 829 |
| 9 | Wavelength shift | nm/C | 0.27 | 0.27 |
| 10 | Characteristic temp, T0 | K | 290 | 350 |
| 11 | Internal QE | | 0.93 | 0.96 |
| 12 | External QE | | 0.725 | 0.81 |
| 13 | Epi resistance, Rs | ohm | 5.0 | 6.5 |

Figure 9A:
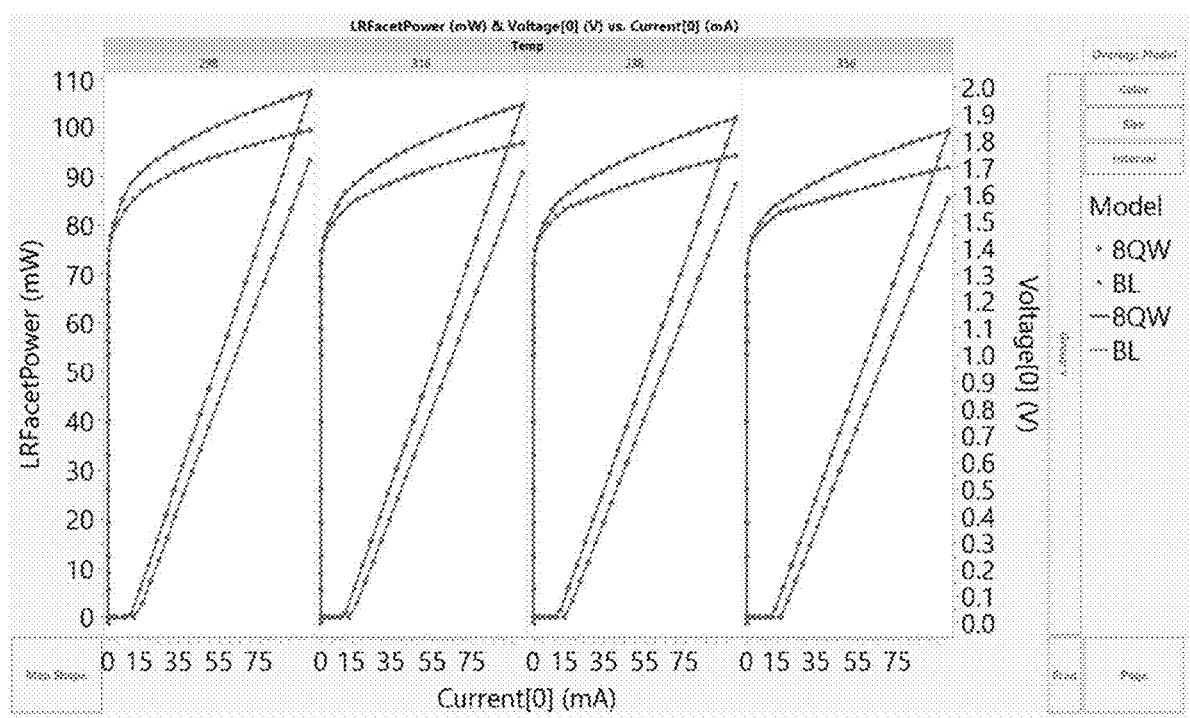
FIG. 9A shows facet power and voltage versus current in accordance with embodiments described herein.

As can be observed, 11 out of the 13 output parameters show improved or substantially similar performance to the baseline. FIGS. 9-10 show additional detail about some of the output parameters. Specifically, FIG. 9A shows facet power and voltage versus current. $I_{th}$ is lower in the eight quantum well laser at about 9.5 mA, while the baseline has an $I_{th}$ of about 12.5 mA at room temperature. The Power Out at about 42 mA is also higher for the eight quantum well system with about 36 mW while the baseline has a power out of about 30 mW.

Figure 9B:
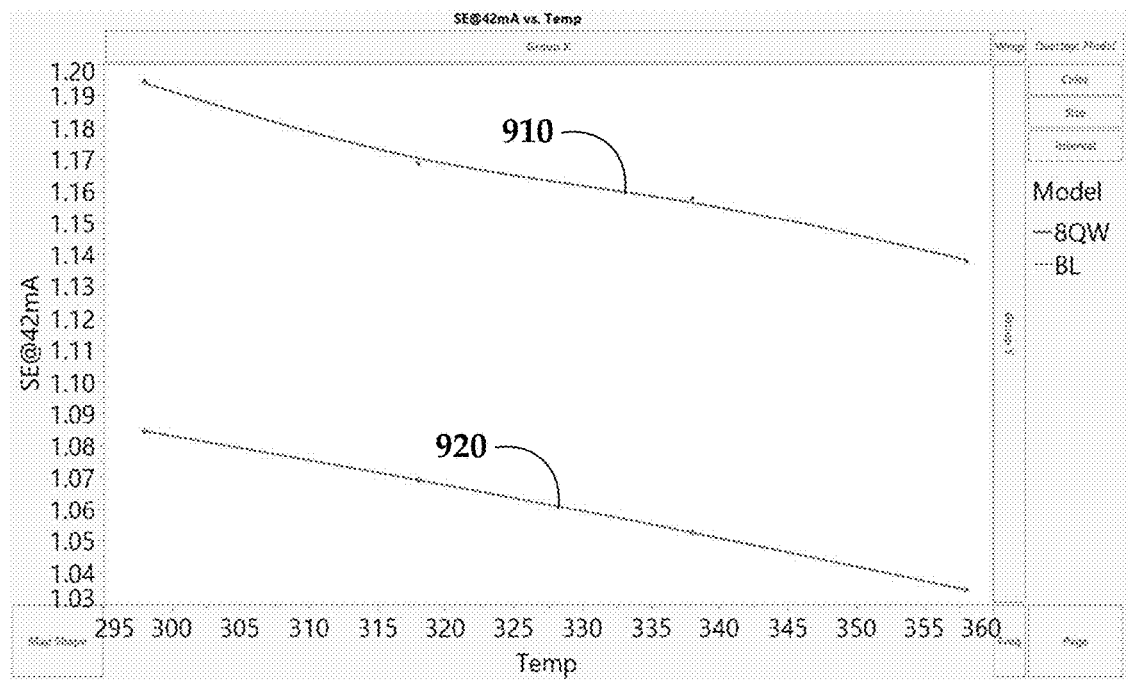
FIG. 9B illustrates the slope efficiency versus temperature for the eight quantum well device and the baseline device in accordance with embodiments described herein.
Figure 10:
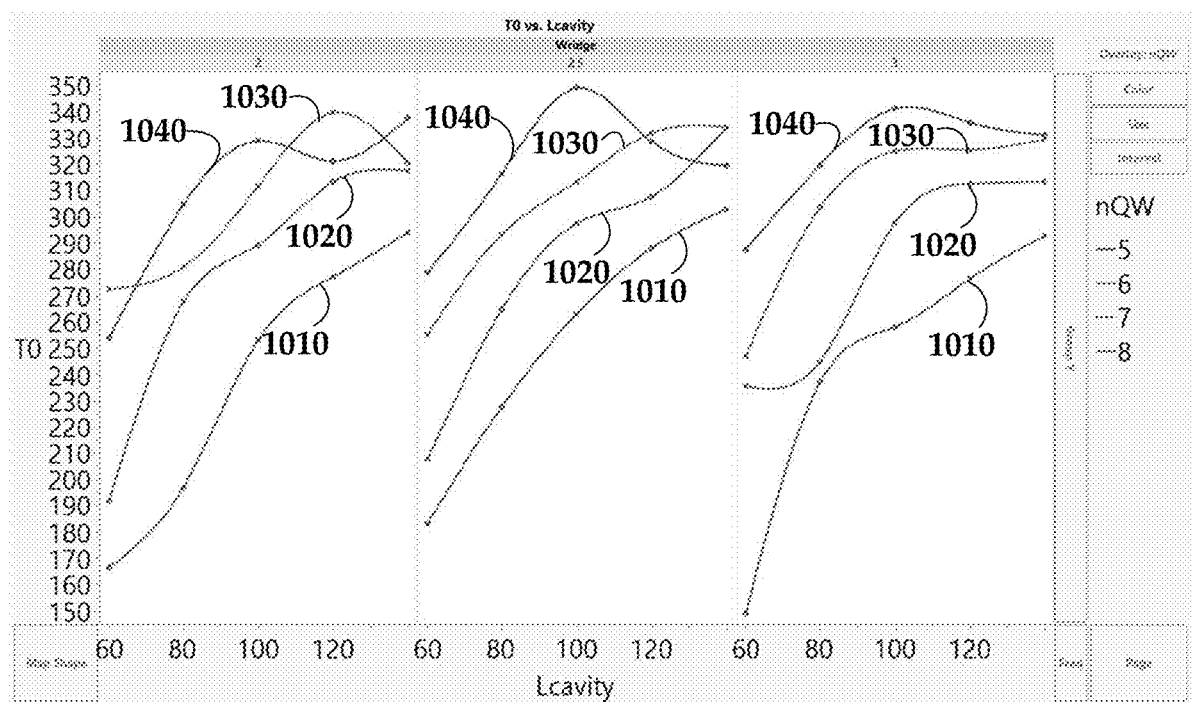
FIG. 10 illustrates TO versus laser cavity length for a laser having five quantum wells, six quantum wells, seven quantum wells, and eight quantum wells in accordance with embodiments described herein.

FIG. 9B illustrates the slope efficiency versus temperature for the eight quantum well device 910 and the baseline device. As can be observed, the Slope Efficiency is highest for the eight quantum laser, measured to be about 1.2 W/A at 42 mA at room temperature. The baseline is about 0.1 W/A, lower than the eight quantum well laser.

Figure 9C:
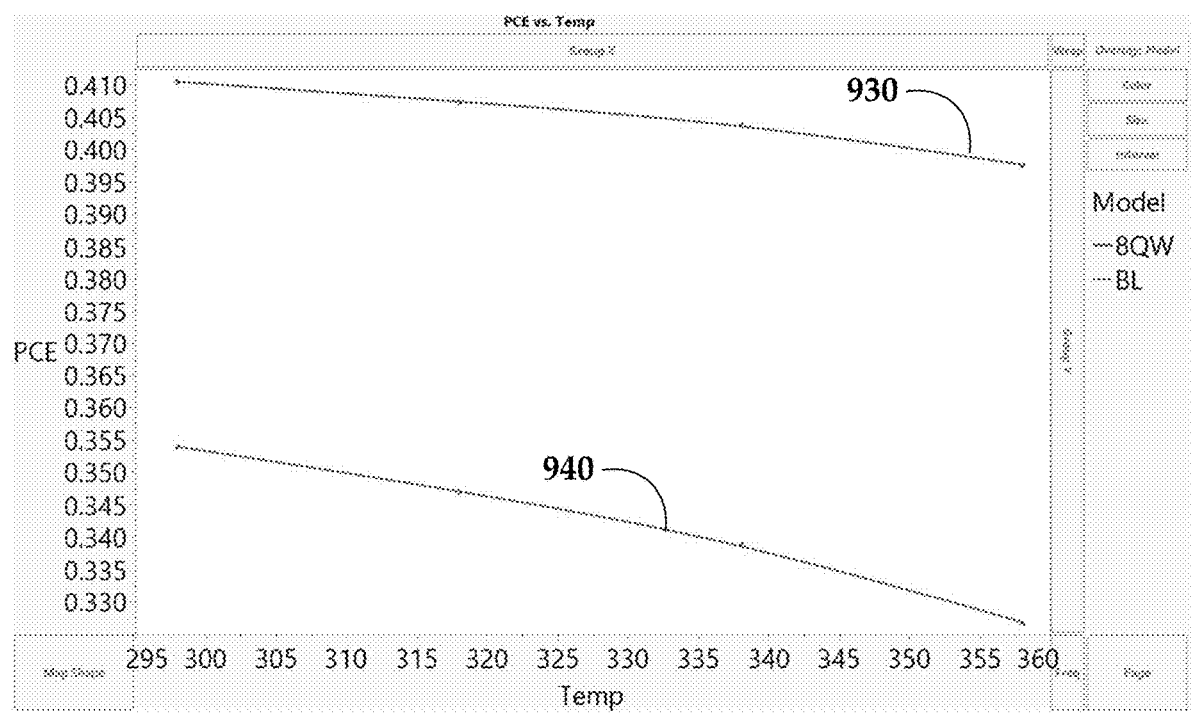
FIG. 9C shows the PCR versus the temperature for the eight quantum well device and the baseline device in accordance with embodiments described herein.

FIG. 9C shows the PCR versus the temperature for the eight quantum well device 930 and the baseline device 940. As can be observed, the PCE is higher for the eight QW system at about 41% at room temperature and not dropping below about 40% at about 85° C. In this example, the baseline's PCE is about 35.5% dropping down to about 33% at higher temperatures.

Figure 9D:
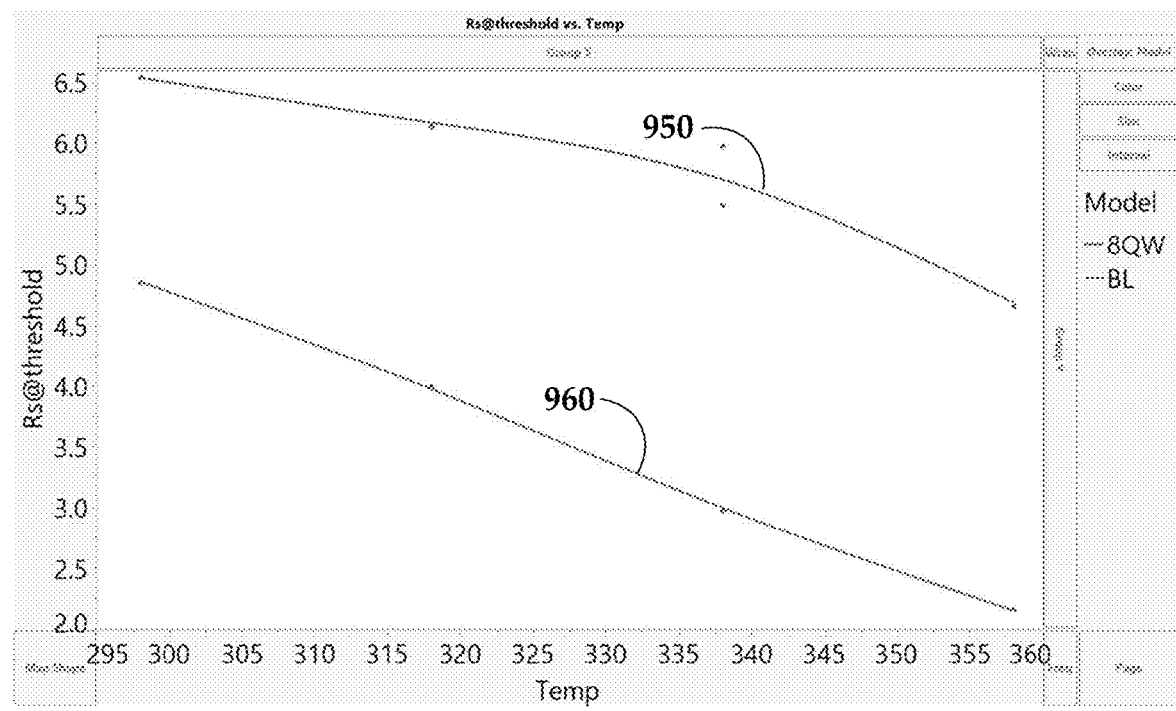
FIG. 9D illustrates the resistance at the threshold current versus the temperature for the eight quantum well device and the baseline device in accordance with embodiments described herein.

FIG. 9D illustrates the resistance at the threshold current versus the temperature for the eight quantum well device 950 and the baseline device 960. As can be observed, the resistance at the threshold current for the eight quantum well laser is about 1.5Ω greater than that of the baseline.

Figure 9E:
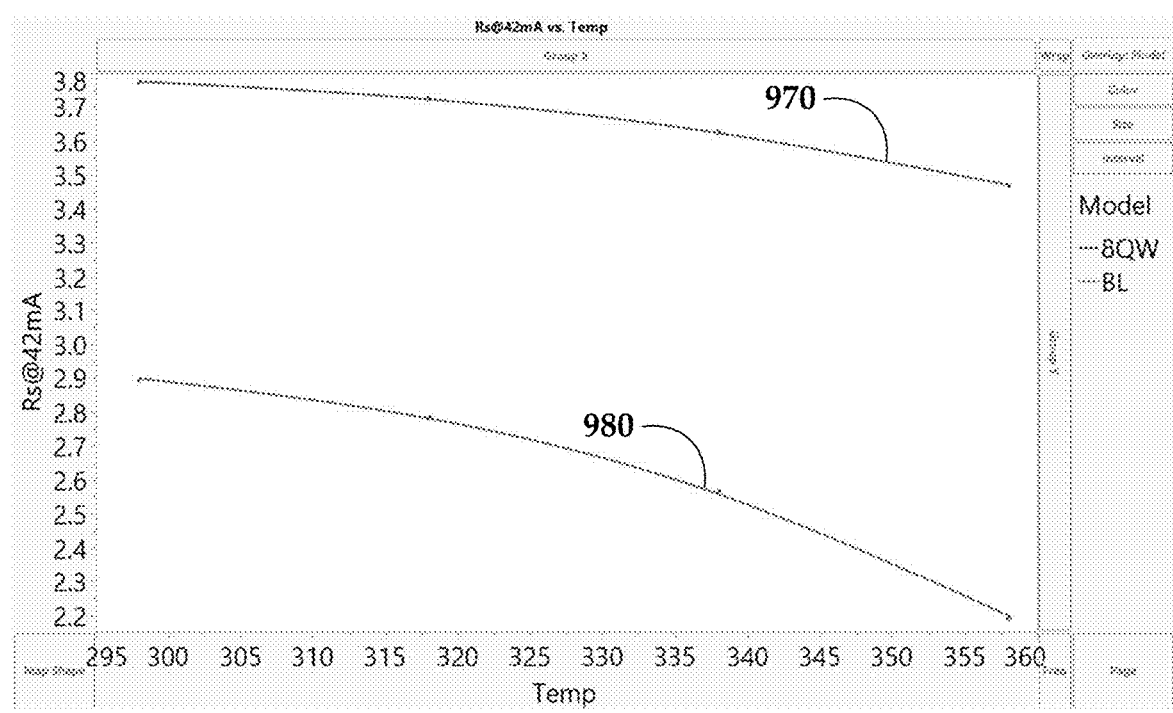
FIG. 9E shows the resistance at about 42 mA versus the temperature for the eight quantum well device and the baseline device in accordance with embodiments described herein.

FIG. 9E shows the resistance at about 42 mA versus the temperature for the eight quantum well device 970 and the baseline device 980. As can be observed, the resistance at about 42 mA for the eight quantum well laser is about 1Ω greater than that of the baseline.

In general, characteristic temperature (T0) is a measure of thermal robustness of a laser. A larger T0 describes a device with a lower threshold current sensitivity to temperature as shown in (1).

$$T_0 = \frac{\Delta T}{\Delta \ln(I_{th})} \quad (1)$$

FIG. 10 illustrates T0 versus laser cavity length for a laser having five quantum wells 1010, six quantum wells 1020, seven quantum wells 1030, and eight quantum wells 1040. As can be observed a T0 is best for a device having eight quantum wells and a ridge width of about 2.5 um with T0 about 350K. The baseline device has a T0 of about 290K.

Due to the significant reduction in the cavity length, the proposed laser can be fitted along the slider width with laser-on slider (LOS) waveguide format, i.e. laser emits directly along the direction of ABS, similar to LOS laser. A laser having the described configuration may allow for a shorter channel waveguide without the requirement of a bend. As a result, less waveguide loss may be realized.

Figure 11:
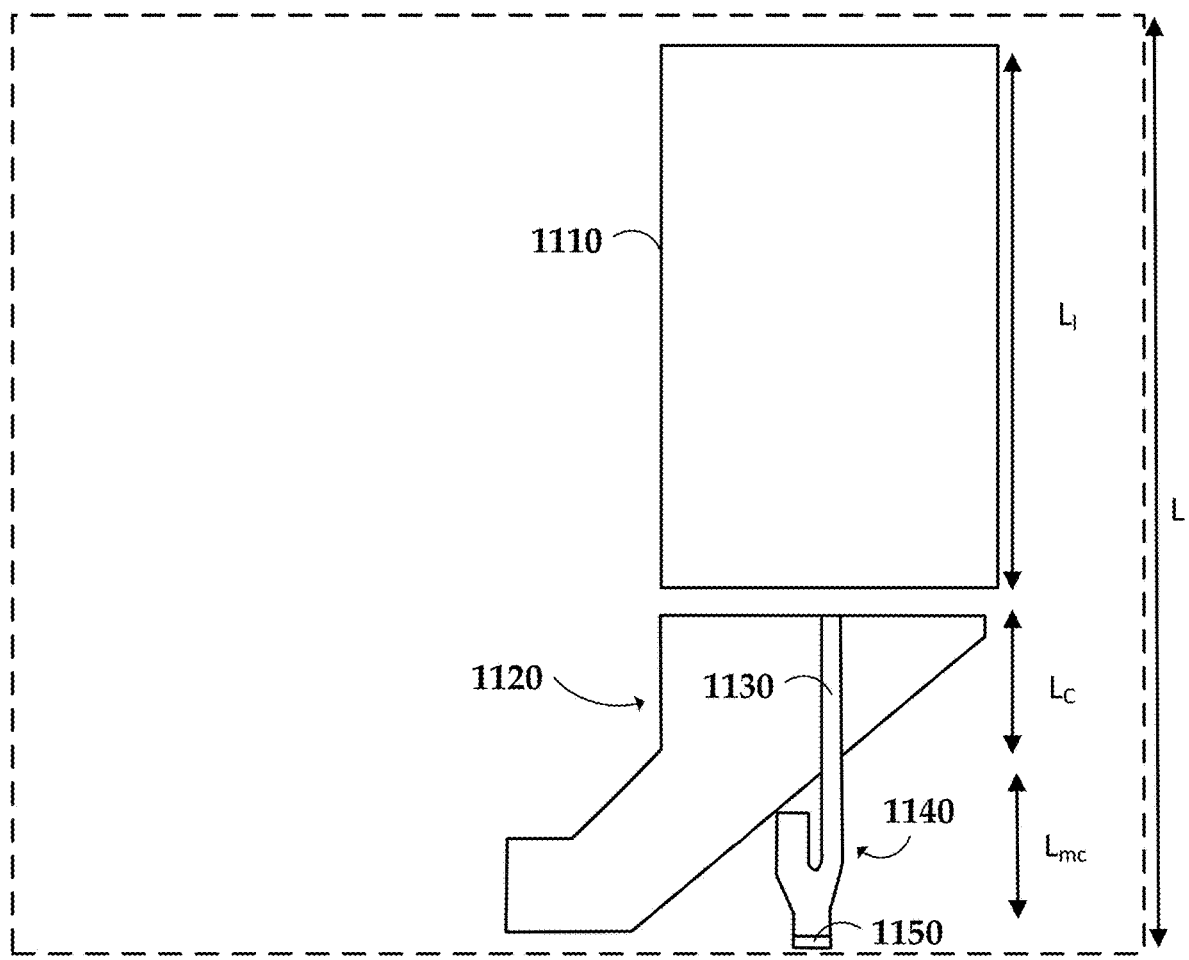
FIG. 11 shows a portion of a slider having a short laser that outputs light in a direction that is parallel to the media facing surface.

FIG. 11 illustrates a shortened on-wafer laser 1110 having a LOS configuration in accordance with embodiments described herein. As can be observed, the laser 1110 emits directly along the direction of the ABS (i.e. substantially perpendicular to a media facing surface) to the waveguide 1130 via an optical input coupler 1120. The laser may have a length, $L_l$, in a range of about 40 um to about 150 um. In some cases, Li is about 100 µm. The optical input coupler may have a length, $L_C$ in a range of about 10 um to about 70 um. The waveguide 1130 may include a mode converter portion 1140 similar to what is described in conjunction with FIGS. 7A and 7B. The mode converter portion may have a length, $L_{mc}$, in a range of about 5 um to about 20 um. The waveguide 1130 directs the mode converted light to the NFT 1150. The total height, H, may be a range of about 160 um to about 200 um.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a substrate;
   a laser disposed above the substrate, the laser comprising one or more non-self-supporting layers of crystalline material, the laser having a length along a light path in a range of about 60 um to about 250 um;
   an optical input coupler configured to receive light from the laser; and
   a waveguide disposed proximate the optical input coupler, the waveguide configured to communicate light from the laser via the optical input coupler to a near-field transducer that directs energy resulting from plasmonic excitation to a recording medium.

2. The apparatus of claim 1, further comprising one or more additional optical components disposed between the laser and the optical input coupler.

3. The apparatus of claim 2, wherein the one or more additional optical components comprise one or more of an optical isolator, a ring resonator, and an optical amplifier.

4. The apparatus of claim 2, wherein the one or more additional optical components are configured to perform one or more of controlling laser stability and boosting the light from the laser to the near-field transducer.

5. The apparatus of claim 1, wherein the waveguide comprises a bend.

6. The apparatus of claim 5, wherein an angle of the bend is about 90 degrees.

7. The apparatus of claim 1, wherein the waveguide comprises a mode converter portion that is configured to convert light received from the laser via the optical input coupler from TE00 to TE10.

8. The apparatus of claim 1, wherein the laser is configured to emit light in a direction that is substantially perpendicular to a media facing surface.

9. The apparatus of claim 1, wherein the laser is configured to emit light in a direction that is substantially parallel to a media facing surface.

10. The apparatus of claim 1, wherein the laser comprises a plurality of quantum wells.

11. The apparatus of claim 1, wherein the laser comprises between two and ten quantum wells.

12. An apparatus comprising:
    a substrate;
    a laser disposed above the substrate, the laser comprising one or more non-self-supporting layers of crystalline material, the laser having a length along a light path in a range of about 60 um to about 250 um;
    an optical input coupler configured to receive light from the laser;
    one or more additional optical components configured to perform one or more of controlling laser stability and boosting the light from the laser to a near-field transducer; and
    a waveguide disposed proximate the optical input coupler, the waveguide configured to communicate light from the laser via the optical input coupler to the near-field transducer that directs energy resulting from plasmonic excitation to a recording medium.

13. The apparatus of claim 12, wherein the one or more additional optical components comprise one or more of an optical isolator, a ring resonator, and an optical amplifier.

14. The apparatus of claim 12, wherein the waveguide comprises a bend.

15. The apparatus of claim 14, wherein an angle of the bend is about 90 degrees.

16. The apparatus of claim 12, wherein the waveguide comprises a mode converter portion that is configured to convert light received from the laser via the optical input coupler from TE00 to TE10.

17. The apparatus of claim 12, wherein the laser is configured to emit light in a direction that is substantially perpendicular to a media facing surface.

18. The apparatus of claim 12, wherein the laser is configured to emit light in a direction that is substantially parallel to a media facing surface.

19. The apparatus of claim 12, wherein the laser comprises a plurality of quantum wells.

20. The apparatus of claim 12, wherein the laser comprises between two and 10 quantum wells.

* * * * *